United States Patent
Ding et al.

(10) Patent No.: US 7,848,221 B2
(45) Date of Patent: Dec. 7, 2010

(54) METHOD AND SYSTEM FOR DETECTING ADJACENT CHANNEL INTERFERENCE FROM OFDM/OFDMA BASED BROADBAND WIRELESS ACCESS

(75) Inventors: Peilu Ding, Schaumburg, IL (US); Ying Cai, Schaumburg, IL (US); Xiang Chen, Rolling Meadows, IL (US); Xiaowei Jin, Palatine, IL (US); Ravindra P. Moorut, Barrington, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 198 days.

(21) Appl. No.: 12/172,462

(22) Filed: Jul. 14, 2008

(65) Prior Publication Data

US 2010/0008217 A1    Jan. 14, 2010

(51) Int. Cl.
*H04J 11/00* (2006.01)
*H04B 7/185* (2006.01)
*H04B 1/10* (2006.01)
*H04B 15/00* (2006.01)
*H04W 4/00* (2009.01)

(52) U.S. Cl. .................. 370/210; 370/317; 370/332; 375/346; 455/63.1

(58) Field of Classification Search ......... 370/203–210, 370/317–320, 332–333, 335, 342–344, 229–238; 375/144, 148, 346, 348, 227, 254; 455/63.1, 455/67.13, 114.2, 135, 222, 226.3, 277.2, 455/278.1, 296, 501, 570
See application file for complete search history.

(56) References Cited

U.S. PATENT DOCUMENTS

| | | | |
|---|---|---|---|
| 6,456,653 B1 * | 9/2002 | Sayeed | 375/227 |
| 6,934,246 B2 | 8/2005 | Park | |
| 7,082,113 B1 * | 7/2006 | Matusevich | 370/330 |
| 7,103,106 B2 | 9/2006 | Park | |
| 7,151,755 B2 * | 12/2006 | Xu | 370/330 |
| 7,221,722 B2 | 5/2007 | Thomas et al. | |
| 7,590,171 B2 * | 9/2009 | Chang et al. | 375/227 |
| 2004/0218519 A1 * | 11/2004 | Chiou et al. | 370/203 |
| 2005/0002324 A1 | 1/2005 | Sutivong et al. | |
| 2007/0036064 A1 * | 2/2007 | Song et al. | 370/206 |
| 2007/0147525 A1 | 6/2007 | Song et al. | |
| 2008/0225998 A1 * | 9/2008 | Fu | 375/346 |
| 2008/0226001 A1 * | 9/2008 | Geng et al. | 375/350 |
| 2009/0190641 A1 * | 7/2009 | Yang | 375/224 |

FOREIGN PATENT DOCUMENTS

WO    03041287 A1    5/2003

OTHER PUBLICATIONS

Choi, Jin Ho: "The International Search Report and The Written Opinion of the International Searching Authority", Korean Intellectual Property Office, Daejeon, Republic of Korea, completed Jan. 21, 2010, mailed: Jan. 21, 2010, all pages.

* cited by examiner

*Primary Examiner*—Tri H Phan

(57) ABSTRACT

Disclosed are a method and system for detecting adjacent channel interference between two systems having neighboring frequencies. The method and system calculates a Fast Fourier Transform (FFT) output for one or more upper and lower frequency side null subcarriers and center data subcarriers of a frequency channel. Power values are calculated for the upper and lower frequency side null subcarriers and the center data subcarriers for use in determining a presence of adjacent channel interference (ACI).

20 Claims, 8 Drawing Sheets ically, the ACI mitigation method and ACI detection procedure is designed for CDMA systems and the filter for a CDMA system needs to be specifically designed to match a chip waveform and receiver filtering.

METHOD AND SYSTEM FOR DETECTING ADJACENT CHANNEL INTERFERENCE FROM OFDM/OFDMA BASED BROADBAND WIRELESS ACCESS

BACKGROUND

1. Technical Field

The present invention generally relates to mobile communication systems and, in particular, to a method and system for detecting adjacent channel interference (ACI) in an orthogonal frequency division multiplexing (OFDM)/OFDMA based broadband wireless access system.

2. Description of the Related Art

For two communication systems that operate on adjacent frequency bands, adjacent channel interference (ACI) in the adjacent frequency bands is usually caused by unwanted emission due to the imperfectness of a transmitting filter. FIG. 1 is a diagram representation of a frequency spectrum 100 of two conventional frequency division duplex (FDD) systems using adjacent frequency bands. The uplink (UL) of the "FDD A" system is adjacent to the UL of the "FDD B" system. Likewise, the downlink (DL) of the FDD A system is adjacent to the DL of the FDD B system. A duplex separation gap is shown to extend from the beginning of the frequencies of the UL of the FDD A system to the beginning of the DL of the FDD A system. If there is only a small frequency gap between the UL of FDD B system and the DL of FDD A system, the ACI can occur between two co-located base stations (BS) and two close-by mobile stations (MS).

FIG. 2 is a block diagram representation of a frequency spectrum 200 of a FDD system and a time division duplex (TDD) system using adjacent frequency bands. The UL of the FDD A system has frequencies that are adjacent to a "TDD B" frequency band. The DL of the FDD A system is adjacent to a second TDD B frequency band. When the two systems involved are two unsynchronized TDDs or one TDD and one FDD, the ACI can be present between two co-located BSs and two close-by MSs. MS-MS interference is the most problematic type of ACI due to the mobility associated with the MSs and the size and cost limitations on the handsets. In particular, as the size of the MS decreases to achieve maximum portability, the dimension of the RF filter used in the MS is very limited. Under current filter technology, it is challenging to build such a RF filter that can achieve the required attenuation at very small frequency offset for mitigating MS-MS interference with such limited dimension. On the other hand, increasing the RF filtering performance of MS also demands additional manufacturing cost. In high user-density areas, such as train stations and coffee shops, two MSs can be close to each other (several meters) and the short distance therebetween may lead to severe performance degradation or warrant a large frequency guard band to mitigate the ACI. BS-BS interference may also require additional channel filter(s) to be installed in the BS.

To save as much spectrum as possible from being wasted as a guard band, several attempts have been made to mitigate the ACI. One example of an ACI mitigation methodology uses system coordination, which needs information on whether ACI exists or not. In the system coordination example, the system detects ACI existence using a channel edge bandpass filter for code division multiplex access (CDMA) systems. Basically, the ACI mitigation method and ACI detection procedure is designed for CDMA systems and the filter for a CDMA system needs to be specifically designed to match a chip waveform and receiver filtering.

If a signal-processing based ACI cancellation method is used, the existence of ACI needs to be determined because such methods usually cause unnecessary computational burden when the ACI does not exist.

In another example, if two systems are both TDD, time synchronization could be used to reduce the timing overlap when one system is working in an uplink cycle and the other is working in a downlink cycle. However, such a method does not apply to the case where one system is FDD and the other is TDD and the case of two FDD systems with small frequency gap between the DL block of system A and the UL block of system B as shown in FIG. 1. Moreover, to completely eliminate the MS-MS interference, the two TDD systems need to have the same downlink/uplink split and frame duration.

In yet another example, a technique to minimize inter-system MS-to-MS interference via inter-system coordination detects the existence of the ACI by tracking the signal interference-to-noise ratio (SINR) change and signal energy at the MS. However, the technique does not employ the frequency spectrum feature of ACI which usually has a higher energy at the channel edge. Therefore, the detection method does not provide reliable results.

BRIEF DESCRIPTION OF THE DRAWINGS

The invention itself will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
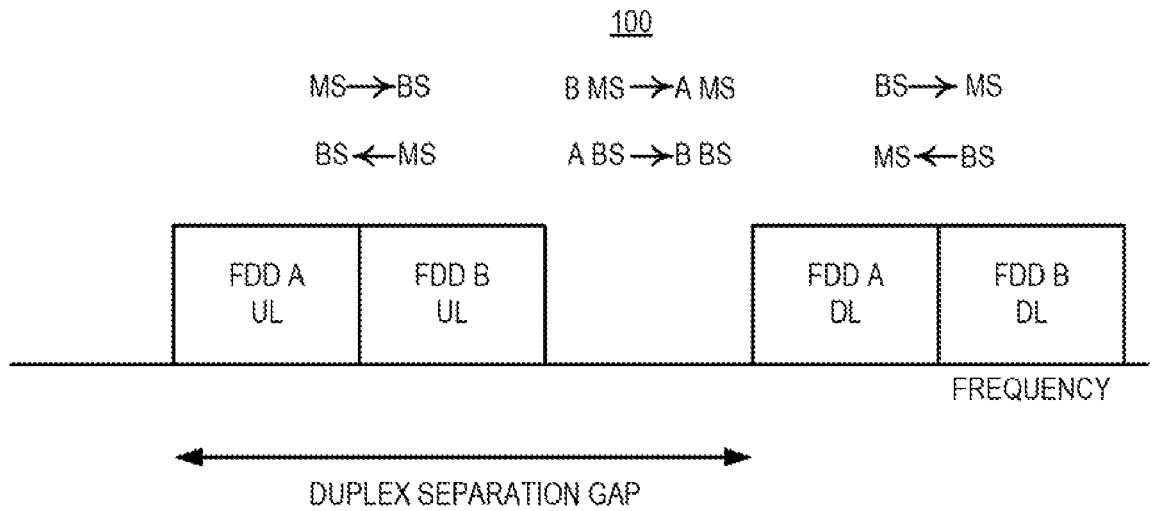
FIG. 1 is a block diagram representation of a frequency arrangement of two conventional frequency division duplex (FDD) systems using adjacent frequency bands.
Figure 2:
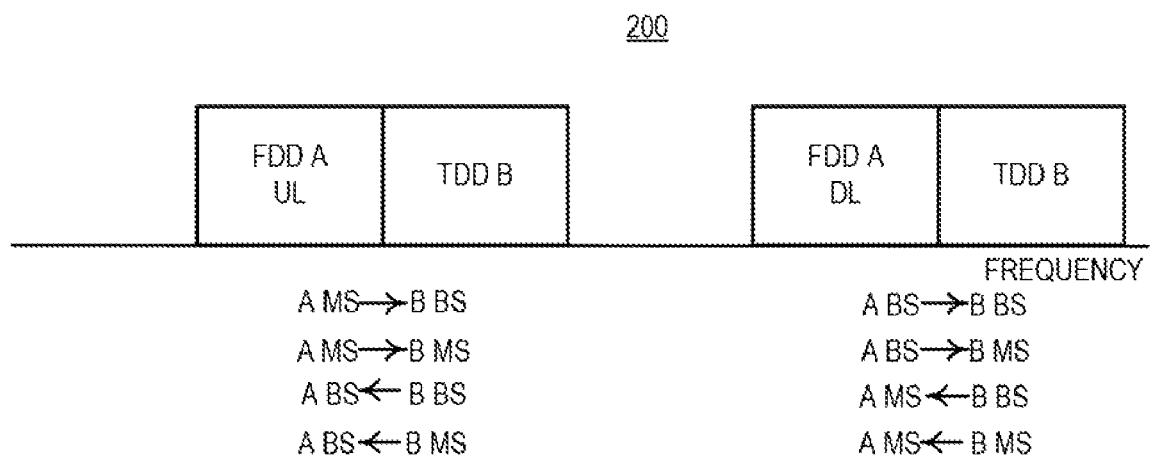
FIG. 2 is a block diagram representation of a frequency response of a conventional FDD system and a conventional time division duplex (TDD) system using adjacent frequency bands.

The illustrative embodiments provide a method and system for the detection of adjacent channel interference (ACI) in OFDM/OFDMA systems utilizing null subcarriers and power values associated therewith to detect ACI.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). The specific numerals assigned to the elements are provided solely to aid in the description and not meant to imply any limitations (structural or functional) on the invention. It should be understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

Figure 3:
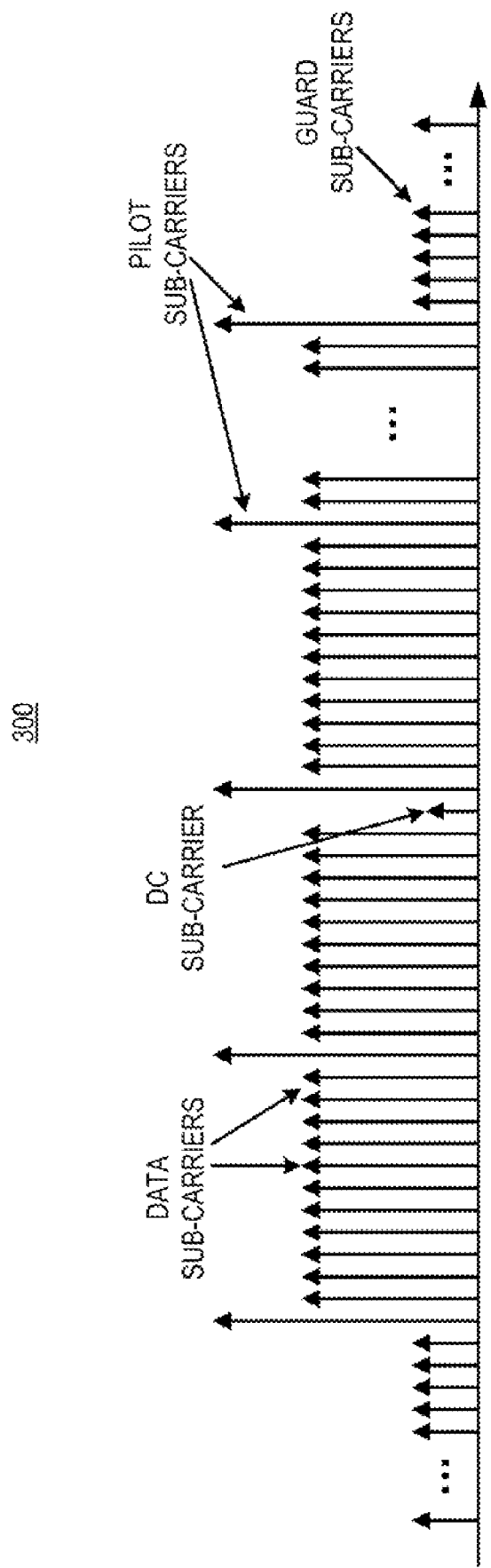
FIG. 3 is a standard Worldwide Interoperability for Microwave Access (WiMax) orthogonal frequency division multiplexing access (OFDMA) subcarrier structure.

FIG. 3 is a standard Worldwide Interoperability for Microwave Access (WiMax) orthogonal frequency division multiplexing access (OFDMA) subcarrier structure 300 for use in one embodiment described herein. For OFDM/OFDMA systems, the channel is divided into a certain number of subcarriers. Generally, the subcarriers can be classified as, data subcarriers, pilot subcarriers, DC subcarriers and null subcarriers (guard subcarriers). Among them, a null subcarrier is created by loading a zero magnitude modulation symbol. Therefore, there is no signal energy on the null subcarriers. The null subcarrier is also referred to as a guard alternative, virtual subcarrier, or unused subcarrier.

The OFDM/OFDMA systems may allocate a certain number of null subcarriers at the channel edges to allow the signal spectrum to roll off and meet bandwidth requirements. For example, for 10 MHz WiMAX systems, the inverse Fast Fourier Transform (IFFT)/Fast Fourier Transform (FFT) size is 1024 subcarriers among which 184 are used as null subcarriers. At the receiver side, the FFT outputs for those null subcarriers are discarded without further processing since the null subcarriers contain no information. However, the FFT outputs can be used to derive the ACI in accordance with one preferred embodiment of the present invention.

Figure 4:
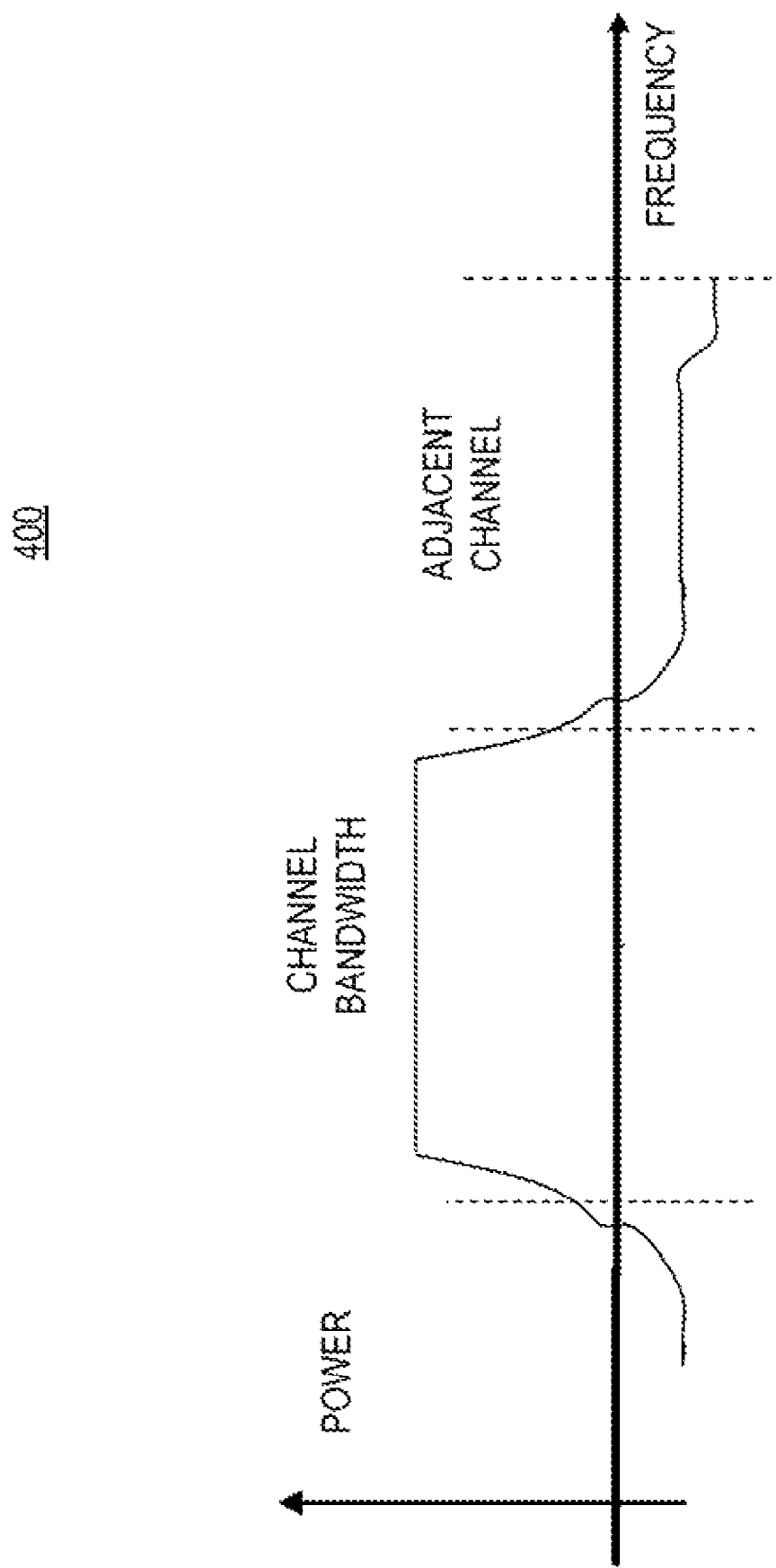
FIG. 4 is a graph of a frequency response of a wideband OFDM/OFDMA signal that includes a frequency response of an unwanted emission signal in the adjacent channel.

FIG. 4 is a graph 400 of a frequency response of a wideband OFDM/OFDMA signal. Due to the imperfectness of the transmit filtering, the signal energy usually leaks outside its assigned channel span. The spectrum of OFDM/OFDMA modulated signal generally rolls off in the order of 1/f where f is the frequency at the channel edge. Therefore, the ACI signal experienced by the equipment operated in the adjacent channel usually has high energy at the channel edge while relatively low energy is present for frequencies further away from the channel edge, as shown.

Figure 5:
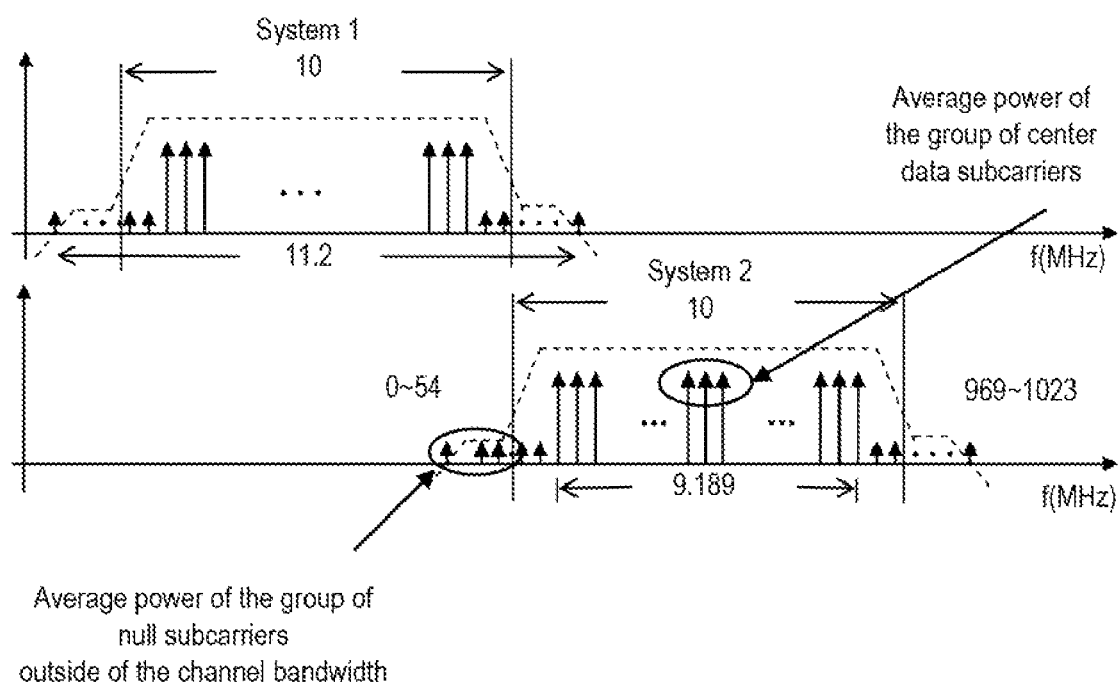
FIG. 5 illustrates plots of the subcarrier locations for two 10 MHz WiMAX systems in adjacent channels.

FIG. 5 shows a plot 500 of the subcarrier locations for two 10 MHz WiMAX systems transmitting in adjacent channels. According to OFDMA-based WiMAX system settings, the frequency occupation of the used subcarriers is less than the defined channel bandwidth while the frequency occupation of all the subcarriers is larger than the channel bandwidth. For example, a WiMAX system with 10 MHz channel size has 840 used subcarriers and 184 null subcarriers with subcarrier frequency spacing of 10.94 KHz. That means the frequency span of the whole 1024 subcarriers is 10.94×1024=11.2 MHz and the used subcarriers occupy 9.189 MHz of frequency. Therefore, it can be seen that when the two 10 MHz WiMAX systems are placed in adjacent channels without any additional external guard band, part of the null subcarriers of one system are actually located inside the channel of the other system, as can be seen in FIG. 5.

As a result of the combination of the expanded frequency span beyond 10 MHz and the frequency response of the ACI (See FIG. 4), the system experiences power on the outermost null subcarriers when the system experiences a strong ACI source on either the upper frequency side or the lower frequency side. Therefore, in accordance with an embodiment of the present invention, the FFT outputs of those null subcarriers can be used to detect the existence of ACI.

Figure 6:
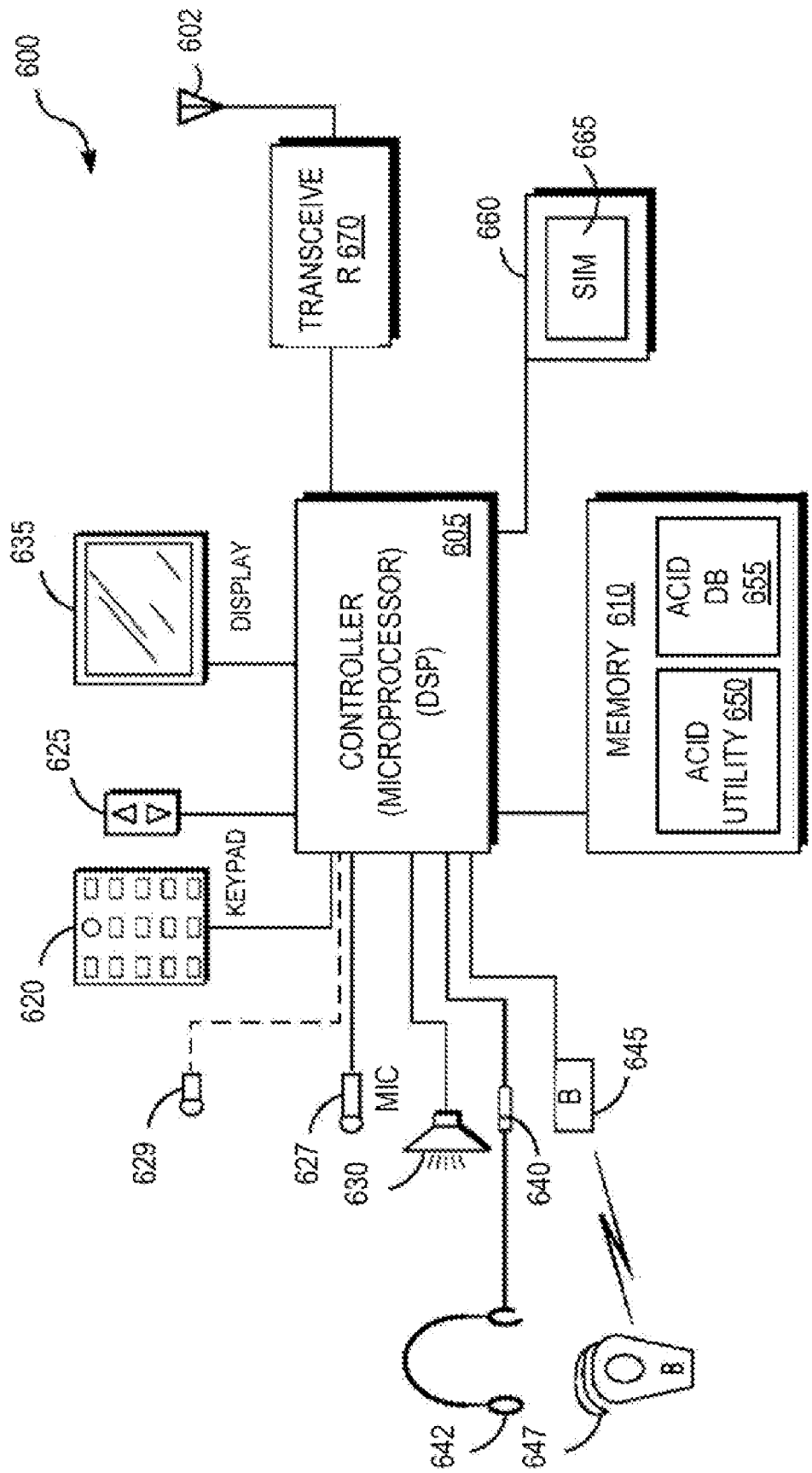
FIG. 6 is a block diagram representation of an example radio device, configured with the functional capabilities required for enabling ACI detection, in accordance with one embodiment of the invention.

FIG. 6 is a block diagram representation of an example radio device, configured with the functional capabilities required for enabling ACI detection, in accordance with one embodiment of the invention. According to the illustrative embodiment, radio device 600 is a cellular/mobile phone. However, it is understood that the functions of the invention are applicable to other types of radio or wireless devices and that the illustration of radio device 700 and description thereof as a cellular phone is provided solely for illustration.

Radio device 600 comprises central controller 605 which is connected to memory 610 and which controls the communications operations of radio device 600 including generation, transmission, reception, and decoding of radio signals. Controller 605 may comprise a programmable microprocessor and/or a digital signal processor (DSP) that controls the overall function of radio device 600. For example, the programmable microprocessor and DSP perform control functions associated with the processing of the present invention as well as other control, data processing and signal processing that is required by radio device 600. In one embodiment, the microprocessor within controller 605 is a conventional multi-purpose microprocessor, such as an MCORE family processor, and the DSP is a 56600 Series DSP, each available from Motorola, Inc.

As illustrated, radio device 600 also comprises input devices, of which keypad 620, volume controller 625, microphone 627, and additional microphone 629 are shown connected to controller 605. Additionally, radio device 600 comprises output devices, including internal speaker 630 and optional display 635, also connected to controller 605. According to the illustrative embodiment, radio device 600 also comprises input/output (I/O) jack 640, which is utilized to plug in an external speaker (642), illustrated as a wire-connected headset. In an alternate implementation, and as illustrated by the figure, Bluetooth-enabled headset 647 is provided as an external speaker and communicates with radio device 600 via Bluetooth adapter 645.

These input and output devices are coupled to controller 605 and allow for user interfacing with radio device 600. For example, microphone 627 is provided for converting voice from the user into electrical signals, while internal speaker 630 provides audio signals (output) to the user. These functions may be further enabled by a voice coder/decoder (vocoder) circuit (not shown) that interconnects microphone 627 and speaker 630 to controller 605 and provide analog-to-digital and or digital-to-analog signal conversion.

In addition to the above components, radio device 600 further includes transceiver 670 which is connected to antenna 602 at which digitized radio frequency (RF) signals are received. Transceiver 670, in combination with antenna 602, enable radio device 600 to transmit and receive wireless RF signals from and to radio device 600. Transceiver 670 includes an RF modulator/demodulator circuit (not shown) that transmits and receives the RF signals via antenna 602. When radio device 600 is a mobile phone, some of the received RF signals may be converted into audio which is outputted during an ongoing phone conversation. The audio output is initially generated at speaker 630 (or external speaker 642 or Bluetooth-enabled headset 647) at a preset volume level (i.e., user setting before dynamic adjustment enabled by the present invention) for the user to hear.

When radio device 600 is a mobile phone, radio device may be a GSM phone and include a Subscriber Identity Module (SIM) card adapter 660 in which external SIM card 665 may be inserted. SIM card 665 may be utilized as a storage device. SIM card adapter 660 couples SIM card 665 to controller 605.

In addition to the above hardware components, several functions of radio device 600 and specific features of the invention are provided as software code, which is stored within memory 610 and executed by microprocessor within controller 605. The microprocessor executes various control software (not shown) to provide overall control for the radio device 600 including adjacent channel interference (ACI) detection, and more specific to the invention, software that enables adjacent channel interference detection (ACID) using null subcarriers. The combination of software and/or firmware that collectively provides the functions of the invention is referred to herein as an (ACID) utility.

As provided by the invention and illustrated within memory 610, an ACID utility 650, has associated therewith an ACID database 655. The functionality of the ACID utility 650 and the ACID database 655 will be described in greater detail below. However, when executed by microprocessor, key functions provided by the ACID utility 650 include, but are not limited to: (1) null subcarriers calculations for a lower frequency side and an upper frequency side; (2) center data subcarriers calculations; (3) average total power calculations for the null subcarriers in the lower frequency side, the null subcarriers in the upper frequency side and the center data subcarriers; 4) center-to-lower frequency side power ratio calculations; 5) center-to-upper frequency side power ratio calculations; and 7) ACI evaluations to protect the system performance and improve the user experience by correcting for the detected ACI. The ACID database 655 stores the results of the calculations generated by the ACID utility 750.

Those of ordinary skill in the art will appreciate that the hardware depicted in FIG. 6 may vary depending on implementation. Other internal hardware or peripheral devices may be used in addition to or in place of the hardware depicted in FIG. 6. Also, the processes of the present invention may be applied to a portable/handheld data processing system or similar device capable of generating audio output. Thus, the depicted example is not meant to imply architectural limitations with respect to the present invention.

Figure 7:
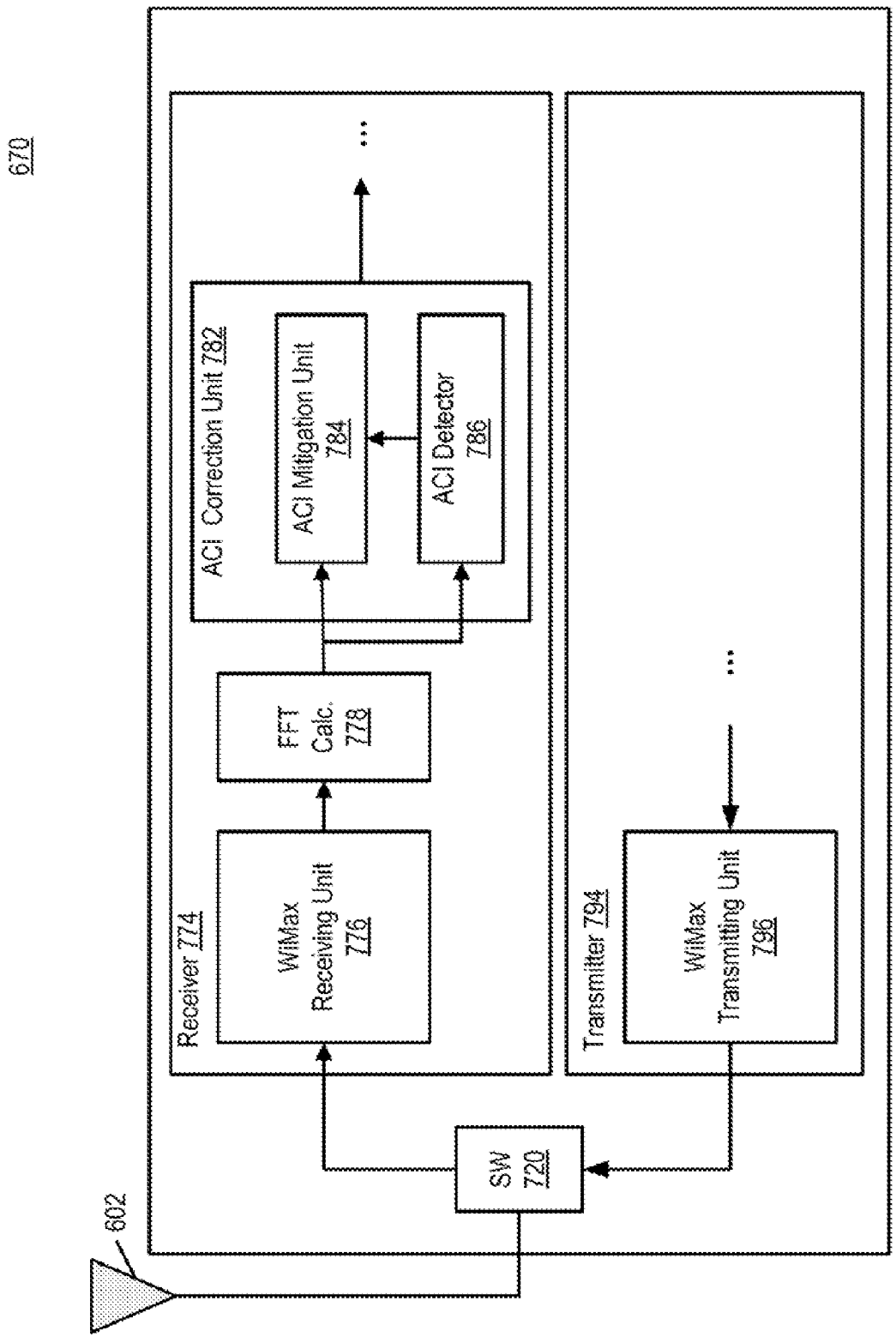
FIG. 7 is a block diagram of the transceiver of FIG. 7 in accordance with one embodiment of the present invention.

FIG. 7 is a block diagram of a receiver 774 and transmitter 794 of transceiver 670. The receiver 774 implements ACI detection in accordance with one embodiment of the present invention. Both the receiver 774 and transmitter 794 are coupled to antenna 602 via switch 720. The receiver 774 has a WiMax receiving unit 776 for receiving and processing the received WiMax signal having frames or packets. The receiving unit 776 is coupled to a FFT calculator 778. The FFT calculator 778 calculates a FFT output for a plurality of subcarriers which are sent to an ACI mitigation unit 784 in an ACI correction unit 782. The null subcarriers are detected by an ACI detector 786 in an ACI correction unit 782. The output from the ACI correction unit 782 is further processed in later stages of the receiver 774. The transmitter 794 includes a WiMax transmitting unit 796 for processing the WiMax signal to be transmitted and generating the RF signal to be sent to the antenna.

Figure 8:
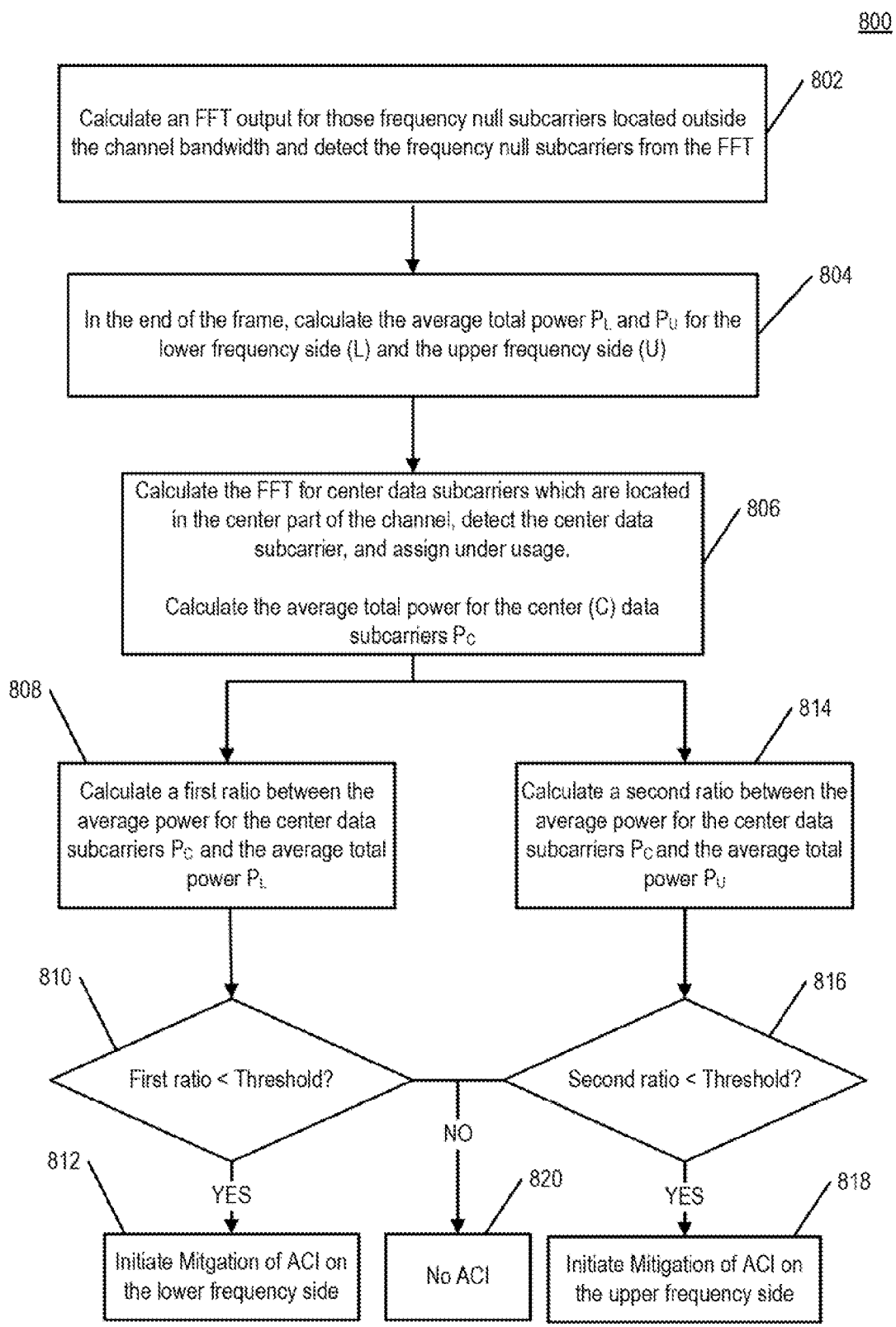
FIG. 8 is a flowchart of a process for detecting ACI in a WiMAX system employing OFDMA in accordance with one embodiment of the present invention.
Figure 9:
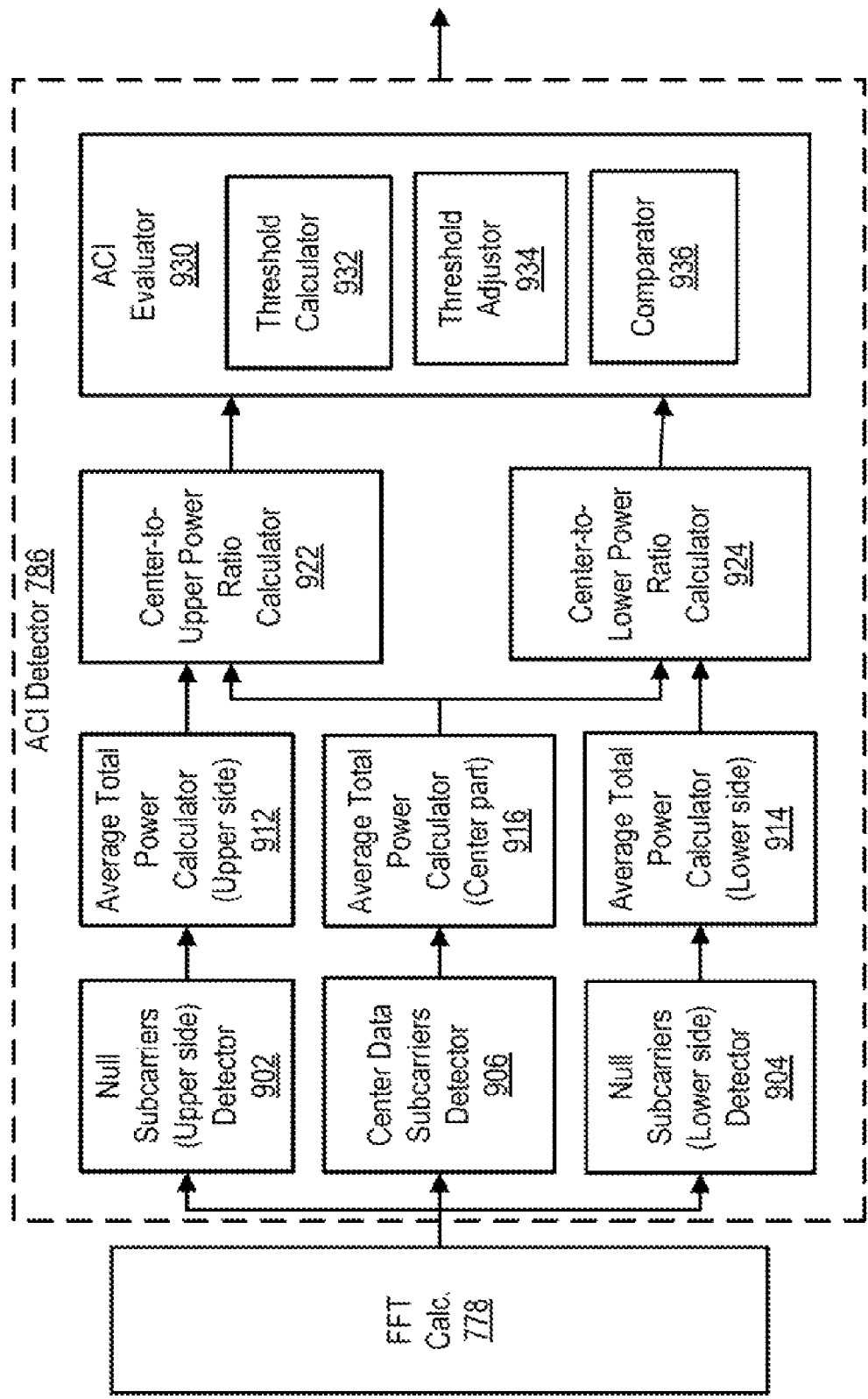
FIG. 9 is a block diagram of an ACI detector of FIG. 8 in accordance with one embodiment of the present invention.

FIG. 8 is a flowchart of the process 800 for detecting the ACI in a WiMAX system employing OFDMA. The process 800 will be described in combination with FIG. 9 which is a block diagram of the ACI detector 786 for use in the transceiver 670 of FIG. 7. The process 800 will be described for an example of a 10 MHz WiMAX system with a null subcarrier assignment such as described above in relation to FIG. 5. Nonetheless, the process is readily adapted for other OFDM/OFDMA systems, such as without limitation, Long Term Evolution (LTE) with a different channel size.

The process 800 begins at block 802 where the FFT output(s) for null subcarriers located outside the channel bandwidth are calculated. At step 803, a null subcarriers (upper frequency side) detector 902 and null subcarriers (lower frequency side) detector 904 for upper frequency side bands and lower frequency side bands, respectively, detect the frequency null subcarriers from the FFT output(s). For example, the null subcarriers outside the channel bandwidth may be those null subcarriers that lie between 10 MHz and 11.2 MHz of the width of the channel. For the setting of FIG. 5, the null subcarriers with numbers 0~54 are for the lower frequency side and subcarriers with numbers 969~1023 are for the upper frequency side that are outside the channel bandwidth of 10 MHz. The ith symbol for the lower frequency side subcarriers is designated in equation Eq(1)

$$y_l(i)=[y_0(i),\ldots y_{54}(i)]^T \quad\quad\quad\quad \text{Eq(1)}$$

where $y_l(i)=[y_0(i),\ldots y_{54}(i)]^T$ is the FFT output for a predetermined number of null subcarriers; and T is the transpose operator. In this embodiment, 0 . . . 54 are the indices of the 55 predetermined selected null (lower frequency side) subcarriers.

The ith symbol for the upper frequency side subcarriers is designated in equation Eq(2)

$$y_u(i)=[y_{969}(i),\ldots y_{1023}(i)]^T \quad\quad\quad\quad \text{Eq(2)}$$

where $y_u(i)=[y_{969}(i),\ldots y_{1023}(i)]^T$ is the FFT output for a predetermined number of null subcarriers; and T is the transpose operator. In this embodiment, 969 . . . 1023 are the indices of the 55 predetermined selected null (upper frequency side) subcarriers.

At block 804, at the end of the frame, the average total power $P_l$ is calculated by the average total power calculator 914 for the lower frequency side (l) according to equation Eq(3)

$$P_l = \frac{1}{N}\sum_{i=0}^{N-1} y_l(i)^H y_l(i). \quad\quad\quad\quad \text{Eq (3)}$$

where l denotes the lower frequency side; H is the conjugate transpose operator; N is the number of symbols in a received frame; and i represents the ith symbol.

The average total power $P_u$ is calculated by the average total power calculator 912 for the upper frequency side (u) according to equation Eq(4)

$$P_u = \frac{1}{N}\sum_{i=0}^{N-1} y_u(i)^H y_u(i), \quad\quad\quad\quad \text{Eq (4)}$$

where u denotes the upper frequency side; H is the conjugate transpose operator; N is the number of symbols in one frame; and i represents the ith symbol.

At block 806, the FFT output for center data subcarriers that are located in the center part of the channel is calculated by the FFT 778 and detected by a center data subcarriers detector 906. The center data subcarriers are assigned as under usage. Additionally, at block 806, the average total power $P_c$ for the center data subcarriers (e.g. 55 subcarriers) is calculated by an average total power calculator 916 for the center data subcarriers (c) according to equation Eq(5)

$$P_c = \frac{1}{N}\sum_{i=0}^{N-1} y_c(i)^H y_c(i), \qquad \text{Eq (5)}$$

where $y_c(i)=[y_{c1}(i), \ldots y_{c55}(i)]^T$ is the FFT output for the 55 used data subcarriers; c1, . . . , c55 are the indices of those selected center data subcarriers; H is the conjugate transpose operator; c denotes the center data subcarriers; and i represents the ith symbol. In this example, 55 subcarriers are used. However, for a different frequency structure, the number of subcarriers may be varied.

At block 808, a first ratio ($\gamma_l$) between the average power $P_c$ for the center data subcarriers to the average power $P_l$ of the lower frequency side null subcarriers is calculated by a center-to-lower power ratio calculator 924 according to equation Eq(6)

$$\gamma_l = 10*lg\left(\frac{P_c}{P_l}\right) \qquad \text{Eq (6)}$$

where lg is a logarithmic function.

At block 814, a second ratio ($\gamma_u$) between the average power $P_c$ for the center data subcarriers to the average power $P_u$ of the upper frequency side null subcarriers is calculated by a center-to-upper power ratio calculator 922 according to equation Eq(7)

$$\gamma_u = 10*lg\left(\frac{P_c}{P_u}\right) \qquad \text{Eq (7)}$$

where lg is a logarithmic function.

At block 810, the first ratio ($\gamma_l$) is compared to a threshold (e.g. $\gamma_l$<threshold) for evaluating the presence of the ACI on the lower frequency side in an ACI evaluator 930. If the first ratio ($\gamma_l$) is determined to be larger than the threshold at block 810, there is no ACI (block 820) on the lower frequency side. However, if the first ratio ($\gamma_l$) is determined to be smaller than the threshold at block 810, there is ACI on the lower frequency side. At block 812, initiation of mitigating the ACI on the lower frequency side takes place.

At block 816, the second ratio ($\gamma_u$) is compared to the threshold (e.g. $\gamma_u$<threshold) for evaluating the presence of the ACI on the upper frequency side in the ACI evaluator 930. If the second ratio ($\gamma_u$) is determined to be larger than the threshold at block 816, there is no ACI (block 820) on the upper frequency side. However, if the second ratio ($\gamma_u$) is determined to be smaller than the threshold at block 816, there is ACI on the upper frequency side. At block 818, initiation of mitigating the ACI on the upper frequency side takes place.

The ACI evaluator 930 includes a threshold calculator 932, a threshold adjustor 934 and comparator 936. At blocks 810 and 816, the threshold is calculated according to equation Eq(8)

$$\beta - \Delta(dB) \qquad \text{Eq(8)}$$

where the parameter $\Delta$ is a tunable parameter for achieving a tradeoff between a false alarm rate and a miss detection rate. The parameter $\beta$ is predefined by a value according to equation Eq(9)

$$\beta = 10*lg\left(\frac{P_c}{P_l}\right) \qquad \text{Eq (9)}$$

where the parameter $\beta$ has a value corresponding to a ratio between the average power $P_c$ for the center data subcarriers to the average power $P_l$ of the lower frequency side null subcarriers representative for a communication system having no ACI in adjacent channels of the communication system. The parameter $\beta$ can be decided by the unwanted emission leakage performance of the home system for the wireless device 600.

The threshold calculator 932 calculates the parameter $\beta$ while a threshold adjustor 934 calculates the parameter $\Delta$ and applies the adjustment to the threshold calculator 932 to derive the expression $\beta-\Delta$ of equation Eq(8). The threshold is used by the comparator 1036 to evaluate the existence of the ACI.

Once the existence of the ACI is determined, the result is applied by the ACI mitigation unit 784 to mitigate the degradation. Examples of mitigation include coordination between two systems for the MS-to-MS interference case or application of an ACI cancellation algorithm through signal processing.

As can be readily seen, the above process 800 is an ACI detection method using the power output of those null subcarriers for general OFDM/OFDMA based systems. The process 800 effectively utilizes the frequency response characteristics of the ACI signal and null subcarriers assignment in OFDM/OFDMA systems.

An advantage of the process 800 is that merely simple add-ons to the software according to the ACID utility 750 can implement the process and no additional hardware or system design modifications are needed. The process 800 can be easily applied to systems like WiMAX, LTE, etc. with simple adaptation. Furthermore, the process 800 can be combined with the known ACI mitigation methods to effectively protect the system performance and improve the user experience from ACI.

In the flowchart above, in some implementations, certain steps of the process may be combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non exclusive list of types of media includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. In a communication system, a method comprising:
calculating, by a Fast Fourier Transform (FFT) calculator, a FFT output for one or more frequency null subcarriers in one or more frequency channels of the communication system;
calculating power values associated with the one or more frequency null subcarriers using the FFT output; and
determining, by an adjacent channel interference (ACI) calculator, a presence of ACI in the one or more frequency channels of the communication system using the calculated power values.

2. The method according to claim 1, wherein calculating the FFT output includes:
calculating a FFT output for one or more upper frequency side null subcarriers in an upper side of the one or more frequency channels; and
calculating a FFT output for one or more lower frequency side null subcarriers in a lower side of the one or more frequency channels.

3. The method according to claim 2, further comprising:
calculating a FFT output for one or more center data subcarriers in a center frequency part of the one or more frequency channels; and
calculating a power value associated with the center data subcarriers wherein the determining the presence of the ACI comprises using the calculated power value for the center data subcarriers.

4. The method according to claim 3, further comprising:
calculating a first ratio between the power value for the one or more upper frequency side null subcarriers to the power value for the one or more center data subcarriers;
calculating a second ratio between the power value for the one or more lower frequency side null subcarriers to the power value for the one or more center data subcarriers; and
wherein the determining comprises comparing the first ratio and the second ratio to a threshold to determine the presence of ACI.

5. The method according to claim 4, further comprising:
calculating the threshold based on a third ratio between a power value for one or more lower frequency side null subcarriers to a power value for one or more center data subcarriers for a communication system having no ACI in adjacent channels of the communication system.

6. The method according to claim 5, further comprising:
adjusting the threshold as a function of one of a false alarm and a miss detection rate.

7. The method according to claim 1, further comprising:
receiving the one or more frequency channels in an orthogonal frequency division multiple access (OFDMA) system.

8. The method according to claim 1, further comprising initiating mitigation to mitigate the ACI upon determining the presence of the ACI.

9. A wireless receiver comprising:
a Fast Fourier Transform (FFT) calculator for calculating a Fast Fourier Transform (FFT) output for one or more frequency null subcarriers in a first frequency channel adjacent a second frequency channel of another system;
at least one calculator coupled to the FFT calculator, the at least one calculator configured to calculate power values associated with the frequency null subcarriers using the FFT output; and
an evaluator coupled to the FFT calculator, the evaluator configured to determine a presence of adjacent channel interference (ACI) in the first frequency channel using the calculated power values.

10. The receiver according to claim 9, wherein the one or more frequency null subcarriers comprises:
one or more upper frequency side null subcarriers in an upper side of the first frequency channel; and
one or more lower frequency side null subcarriers in a lower side of the first frequency channel.

11. The receiver according to claim 10, wherein
the Fast Fourier Transform (FFT) calculator is further configured to calculate a Fast Fourier Transform (FFT) output for one or more center data subcarriers in a center frequency part of the first frequency channel;
the at least one calculator is configured to calculate a power value for the one or more center data subcarriers; and
wherein the evaluator is configured to determine the presence of the ACI in the first frequency channel using the power value for the center data subcarriers.

12. The receiver according to claim 11, further comprising:
a first ratio calculator configured to calculate a first ratio between the power value for the one or more upper frequency side null subcarriers to the power value for the one or more center data subcarriers;

a second ratio calculator configured to calculate a second ratio between the power value for the one or more lower frequency side null subcarriers to the power value for the one or more center data subcarriers; and wherein the evaluator is further configured to compare the first ratio and the second ratio to a threshold to determine the presence of ACI in the first frequency.

13. The receiver according to claim 12, further comprising:
a threshold calculator configured to calculate the threshold based on a third ratio between a power value for one or more lower frequency side subcarriers to a power value for one or more center data subcarriers for a communication system having no ACI in adjacent channels of the communication system.

14. The receiver according to claim 13, further comprising:
a threshold adjustor configured to adjust the threshold as a function of a false alarm and a miss detection rate.

15. The receiver according to claim 9, further comprising:
a receiving unit configured to receive the first frequency channel in accordance with an orthogonal frequency division multiple access (OFDMA) protocol.

16. The receiver according to claim 9 further comprising a mitigation initiator configured to initiate mitigation of the ACI upon determining the presence of the ACI.

17. A wireless receiver comprising:
a processor configured to calculate a Fast Fourier Transform (FFT) output for one or more frequency null subcarriers in a first frequency channel adjacent a second frequency channel of another system; calculate power values associated with the frequency null subcarriers using the FFT output; and determine a presence of adjacent channel interference (ACI) in the first frequency channel using the calculated power values; and a memory coupled to the processor and configured to store results of calculations.

18. The receiver according to claim 17, wherein the one or more frequency null subcarriers comprises:
one or more upper frequency side null subcarriers in an upper side of the first frequency channel; and
one or more lower frequency side null subcarriers in a lower side of the first frequency channel.

19. The receiver according to claim 18, wherein the processor is further configured to calculate a Fast Fourier Transform (FFT) output for one or more center data subcarriers in a center frequency part of the first frequency channel; calculate a power value for the one or more center data subcarriers; and when determining the presence of the ACI in the first frequency channel, determine the presence of the ACI also using the power value for the center data subcarriers.

20. The receiver according to claim 19, wherein the processor is further configured to calculate a first ratio between the power value for the one or more upper frequency side null subcarriers to the power value for the one or more center data subcarriers; calculate a second ratio between the power value for the one or more lower frequency side null subcarriers to the power value for the one or more center data subcarriers; and when determining the presence of the ACI, compare the first ratio and the second ratio to a threshold to determine the ACI in the first frequency.

\* \* \* \* \*